United States Patent
Hendrickson et al.

(10) Patent No.: US 9,045,809 B2
(45) Date of Patent: Jun. 2, 2015

(54) RECLAIMING AND INHIBITING ACTIVATION OF DRI FINES

(71) Applicant: NU-IRON TECHNOLOGY, LLC, Charlotte, NC (US)

(72) Inventors: David Hendrickson, Coleraine, MN (US); John Brandon, Charlotte, NC (US); Les Hart, Baton Rouge, LA (US); John Anderson, Madison, AL (US)

(73) Assignee: NU-IRON TECHNOLOGY, LLC, Charlotte, NC (US)

( * ) Notice: Subject to any disclaimer, the term of this patent is extended or adjusted under 35 U.S.C. 154(b) by 167 days.

(21) Appl. No.: 13/889,684

(22) Filed: May 8, 2013

(65) Prior Publication Data
US 2013/0291682 A1  Nov. 7, 2013

Related U.S. Application Data

(63) Continuation of application No. PCT/US2013/039767, filed on May 6, 2013.

(60) Provisional application No. 61/643,259, filed on May 5, 2012.

(51) Int. Cl.
*C22B 1/16*  (2006.01)
*C23F 11/00*  (2006.01)
(Continued)

(52) U.S. Cl.
CPC . *C22B 1/16* (2013.01); *C23F 11/00* (2013.01); *C23F 15/00* (2013.01); *C23F 14/00* (2013.01); *C22B 1/216* (2013.01); *C22B 1/2406* (2013.01); *C22B 1/244* (2013.01); *C21B 13/0093* (2013.01)

(58) Field of Classification Search
CPC .......... C22B 1/16; C22B 1/216; C22B 1/244; C22B 1/2406; C21B 13/0093; C23F 11/00; C23F 15/00; C23F 14/00
See application file for complete search history.

(56) References Cited

U.S. PATENT DOCUMENTS 2,833,642 A   5/1958  Barker et al.
2,874,037 A   2/1959  Fisher
(Continued)

FOREIGN PATENT DOCUMENTS

AU    2008327116 B2 *  8/2011
GB    2129708 A *  5/1984
(Continued)

OTHER PUBLICATIONS

Takai, H., "Factors Influencing dust reduction efficiency of spraying of oil-water mixtures in pig buildings", Dust Conf 2007, NL, Takai.
(Continued)

*Primary Examiner* — George Wyszomierski
*Assistant Examiner* — Tima M McGuthry Banks
(74) *Attorney, Agent, or Firm* — Hahn Loeser & Parks LLP

(57) ABSTRACT

A method of reclaiming and inhibiting activation of DRI including forming a moving stream or pile containing DRI pellets and DRI fines and applying to said DRI material a coating material optionally having a melting point between 70 and 200° F. and comprising at least one antioxidant and at least one a carboxylic material with at least one selected from the group consisting of coatable fatty acid and an esterified derivative thereof, forming a coating on the DRI pellets and DRI fines to cause the fines to adhere together and to the pellets to form a plurality of DRI agglomerates. The coating material may be selected from the group consisting of palm oil, coconut oil, combinations thereof, and ester derivatives thereof. The antioxidant in the coating material is selected from the group consisting of at least one of butylated hydroxytoluene, carotenoid, phytosterol, squalene, vitamin E, tocopherols, tocotrienols, and mixtures thereof.

37 Claims, 13 Drawing Sheets

(51) Int. Cl.
*C23F 14/00* (2006.01)
*C23F 15/00* (2006.01)
*C22B 1/216* (2006.01)
*C22B 1/24* (2006.01)
*C22B 1/244* (2006.01)
*C21B 13/00* (2006.01)

(56) References Cited

U.S. PATENT DOCUMENTS

| | | |
|---|---|---|
| 3,407,089 A | 10/1968 | Sampson |
| 3,520,676 A | 7/1970 | Stahr |
| 3,556,838 A | 1/1971 | Segura |
| 4,030,913 A | 6/1977 | Wegener |
| 4,069,015 A | 1/1978 | Ahrendt et al. |
| 4,329,168 A | 5/1982 | Rubio |
| 4,407,864 A * | 10/1983 | Stift et al. ............ 427/216 |
| 4,417,992 A | 11/1983 | Bhattacharyya et al. |
| 4,692,353 A | 9/1987 | Ahmed |
| 5,264,023 A | 11/1993 | Missol et al. |
| 6,589,442 B1 | 7/2003 | Wilson et al. |

FOREIGN PATENT DOCUMENTS

| | | |
|---|---|---|
| WO | 03052149 | 6/2003 |
| WO | 2006010721 | 2/2006 |
| WO | 2008100921 | 8/2008 |
| WO | 2012-034015 A1 | 3/2012 |

OTHER PUBLICATIONS

Shahidi, et al., "Stabiliztion of Canola Oil by Natural Antioxidants", Lipids in Food Flavors 1993, 301-314.

* cited by examiner

RECLAIMING AND INHIBITING ACTIVATION OF DRI FINES

This application is a continuation of Patent Application No. PCT/US2013/039767 filed on May 6, 2013, which claims priority to and the benefit of U.S. Patent Application No. 61/643,259 filed on May 5, 2012, both of which are incorporated herein by reference.

BACKGROUND AND SUMMARY OF THE DISCLOSURE

The present disclosure relates to systems and methods for making direct reduced iron. Direct reduced iron (DRI) is a commercial product of more than 80% metallic iron, and, typically, more than 90% metallic iron, widely used as a source material for making steel. The remainder of the DRI product is gangue, which is high in silica. The conventional techniques for making steel involve the use of an electric arc furnace (EAF) or a basic oxygen furnace (BOF). DRI is typically higher in iron units than taconite pellets and other sources of iron and can be used as a partial substitute for scrap in production of steel by EAF.

DRI may be formed from beneficiated iron ore, such as taconite pellets. For example, taconite has been mined and crushed, and the iron containing portions magnetically separated from the non-magnetic portions to form a beneficiated product substantially higher in iron content than mined taconite. The beneficiated iron ore portion may be formed into pellets by pelletizing, and heated in the presence of a gaseous or solid reducing agent, such as natural gas, propane or coal, to a temperature below the melting point of iron to promote the reduction of iron ore to form DRI. The heating may be done in a linear hearth furnace (LHF) or in a shaft furnace such as the one disclosed in U.S. Pat. Nos. 3,749,386, 3,748,120 and 6,214,086. In any case, the reducing agent may be a gas percolated through the iron ore pellets or a solid such as coal mixed with the iron ore pellets before being heated in the furnace.

In any case, in the process to make DRI, the pelletized iron oxide containing material is moved through a furnace mixed with a reducing agent, such as natural gas, propane, coal, coke, or another form of carbonaceous material. A desulfurizing agent, such as limestone or dolomite, may also be added. The iron oxide material reacts chemically in the reducing zone of the furnace to partially reduce the iron oxide to form the DRI.

DRI is difficult to transport because it is highly reactive with oxygen in air and moisture. The DRI, known as sponge iron, has a high porosity with many voids making it porous in nature. With the high porosity of DRI, it has low compressive strength. When the DRI is stored, for example, in the hold of a ship or barge during transportation, some of the pellets have been prone to break apart under the weight of pellets above them, further promoting the likelihood of the DRI reacting with oxygen and moisture around it. Additionally, the rough surface characteristics of the DRI pellets produce DRI fines having a high surface area which also promoted the likelihood of the DRI reacting with the oxygen and moisture around it. Such DRI fines typically are produced throughout the transportation and storage of the DRI product making it difficult to transport DRI over long distances and to store DRI for long periods.

DRI is usually made, transported, and stored in the form of DRI pellets, accompanied by DRI fines. The porous, low internal strength, and flakey nature of such DRI compacts work to increase the surface area of the DRI compact that is exposed to an oxidizing atmosphere, resulting in substantial and rapid oxidation (rusting). The amount of DRI fines is thus increased during transportation and storage of the DRI product before delivery to the steelmaking furnace. The reactions that occur during DRI oxidation produce heat and hydrogen, making DRI susceptible to overheating and combustion. Increases in temperature in containers storing DRI, in which air is free to circulate, can reach 1200° F. Such combustion causes fires in the holds of ships and barges during transportation of DRI, and even in the clam shell buckets of cranes when unloading DRI. These circumstances have substantially increased the cost of DRI product delivered to a steel plant because of the losses of iron units in handling and hazards encountered during transportation and storage. Due to the difficulties and risks associated with transporting DRI product, production of DRI has, with a few exceptions, been generally located near the steelmaking facilities and near the time of use in steelmaking, rather than in more economical locations and times.

Consequently, various techniques have been used in the past to passivate DRI to reduce the risks associated with its pyrophoric properties. Examples of such passivation chemistry used in the past include aqueous solutions of a water soluble alkali metal silicate coating, organic amine vapors, or aqueous solution of organic amines coating, petroleum wax with a solid polymer of an olefin having 2 to 4 carbon atoms coatings, water soluble stearates, and like water repellant additive coating, hydrated calcined limestone (lime dust) coating, polymerizing aliphatic 1-olefin of less than 6 carbon atoms with catalytic material coating, ferritic chromium containing alloy coating, naphthenic petroleum/glycerol monoester coating, varnish, and heated paraffin wax coating.

Natural triglycerides such as soybean oil, sunflower oil, coconut oil, cottonseed oil, and castor oil have been proposed as a nonaqueous foam for use as a dust suppressant with iron ore pellets. See WO 2006/010721. These dust suppressants are preferably applied in the presence of a surfactant such HCF-740, a mixture of florosurfactants and hydrocarbon solvents, HCF-730, a nonionic mixture of silane surfactants, HCF-720, a nonionic mixture of silane surfactants and fluorosurfactants, or HCF-710 a nonionic mixture of silane surfactants and sulfonic acids. Id at 4. Such surfactants have been proposed to be used in amounts of 0.2 to 5% by weight per weight of DRI dust or fines. While iron ores are generally relatively stable oxides, DRI pellets and DRI fines are very different with high porosity and high reactive surfaces, and, accordingly, DRI pellets and DRI fines in the presence of these natural triglycerides tend to break down the triglycerides producing high levels of CO, which is highly undesirable with transportation of DRI.

Moreover, such treatment techniques generally have involved separation of the DRI fine particles from the DRI pellets and discarding the separated fines as waste. This involved reduction of iron yield and loss of iron units because the DRI fines were fugitive and not recovered. A need has existed for reclaiming the iron units of DRI fines to improve the efficiency of the use of DRI in steelmaking. Further, there still remains, despite various attempts, a need for an economic and efficient way of reducing the pyrophobic risks in transportation and handling of DRI pellets. A strong, stable, and pyrophobic product would enable the safe transport and storage of DRI, dramatically increasing the usefulness and effectiveness of DRI in steelmaking.

Disclosed is a method of reclaiming and inhibiting activation of DRI that comprises the steps of: (a) forming a moving stream containing pellets and fines of DRI, and (b) applying on said moving stream a coating material having a melting point between 70 and 200° F. and comprising at least one antioxidant and at least one carboxylic material comprising at least one selected from the group consisting of coatable fatty acid and an esterified derivative thereof to form a coating on the pellets and fines and (c) causing the fines to adhere together and to the pellets to form a plurality of agglomerates of DRI which are typically more than 90% metallic iron.

The coating material may be heated before application to form a liquid or semi-liquid and applied to the moving stream of DRI pellets and DRI fines as they are a falling stream when the step of coating occurs. The coating material may be applied as a liquid or semi-liquid in different droplet sizes to facilitate coverage of the fines and pellets with the coating material. Alternatively, the coating material may be applied as a solid or semi-solid, such as in the form of shavings, or granules to the stream of the DRI pellets and the DRI fines, on a conveyor and heating the DRI pellet and DRI fines with the coating material to promote the coating of the DRI pellets and DRI fines with coating material.

In any case, the coating material may be applied at a rate of less than 0.2% by weight or may be applied at a rate between 0.005 and 0.45% by weight per ton of pellets and fines coated. In any case, the coating material may be selected from the group consisting of palm oil, coconut oil, combinations thereof, and ester derivatives thereof, include at least one antioxidant and may include carboxylic material more than 30% by weight monounsaturated acid, and/or more than 30% by weight oleic acid. The antioxidant in the coating material may be selected from the group consisting of at least one of butlylated hydrooxytoluene, carotenoid, phytosterol, squalene, vitamin E, tocopherols, tocotrienols, and mixtures thereof. The coating material may be applied at a rate between 0.2 and 2.0 gallons per ton of coated DRI coated, or between 0.4 and 1.0 gallon per ton of DRI coated.

Alternatively, disclosed is a method of reclaiming and inhibiting activation of DRI fines comprising the steps of: (a) applying a coating material to a pile of DRI pellets and DRI fines while the pellets and the fines are added to, or removed from the pile, where the coating material has a melting point between 70 and 200° F., and including at least an antioxidant and may include at least one carboxylic material and at least one selected from the group consisting of fatty acid carboxylic material and an esterifed derivative thereof, (b) causing the DRI fines to adhere together and, optionally, to the DRI pellets to form a plurality of DRI agglomerates, typically more than 90% metallic iron; and (c) moving the DRI agglomerates formed from coated pellets and coated fines to a facility for present or future use in making steel.

Here again, the coating material may be heated before application to form a liquid or semi-liquid before or during the step of coating, and may be with different droplet sizes to facilitate coverage of the DRI fines and DRI pellets before or during the step of coating. Alternatively, the coating material may be applied as a solid or semi-solid, such as in the form of shavings or granules, to the DRI pellets and the DRI fines, and providing heat to promote coating of the DRI pellets and DRI fines. In any case, the coating material may be applied at a rate less than 0.2% of the coated DRI or may be applied at between 0.005 and 0.45% by weight per ton of DRI pellets and DRI fines coated. In any case, the coating material may be again selected from the group consisting of palm oil, coconut oil, combinations thereof, and ester derivatives thereof, to include at least one antioxidant and, in addition or in the alternative, may include carboxylic material more than 30% by weight monounsaturated acid, and/or more than 30% by weight oleic acid. The antioxidant in the coating material may also be selected from the group consisting of at least one of butllated hydroxytoluene, carotenoid, phytosterol, squalene, vitamin E, tocopherols, tocotrienols, and mixtures thereof. The coating material may be applied at a rate between 0.2 and 2.0 gallons per ton of coated DRI, or between 0.4 and 1.0 gallon per ton of DRI coated.

In another alternative, disclosed is a method of reclaiming and inhibiting activation of metallic iron fines comprising the steps of: (a) coating DRI fines with a coating material having a melting point between 70 and 200° F., including at least one antioxidant, and, alternatively or in addition, at least one selected for the group consisting of coatable fatty acid and an esterified derivative thereof to form a coating on the fines, and (b) causing coated DRI fines to adhere together to form a plurality of DRI agglomerates. The DRI agglomerates containing coated fines may then be moved to a facility for immediate or future use in making steel.

Again, the coating material may be heated before application to form a liquid or semi-liquid before or during the step of coating, and may be with different droplet sizes to facilitate coverage of both DRI pellets and DRI fines before or during the step of coating. Alternatively, the coating material may be applied as a solid or semi-solid, such as in the form of shavings or granules, to the DRI pellets and the DRI fines and heated to facilitate coating. In any case, the coating material may be applied at a rate less than 0.2% or may be applied at a rate between 0.005 and 0.45% by weight per ton of DRI pellets and DRI fines coated. In any case, the coating material may be applied at a rate less than 0.2% of DRI coated or may be applied at a rate between 0.005 and 0.45% by weight per ton of pellets and fines coated. In any case, the coating material may be again selected from the group consisting of palm oil, coconut oil, combinations thereof, and ester derivatives thereof, and, alternatively or in addition, the coating material includes carboxylic material more than 30% by weight monounsaturated acid, and/or more than 30% by weight oleic acid. The antioxidant in the coating material may also be selected from the group consisting of at least one of butylated hydroxytoluene, carotenoid, phytosterol, squalene, vitamin E, tocopherols, tocotrienols, and mixtures thereof. The coating material may be applied at a rate between 0.2 and 2.0 gallons per ton of coated DRI coated, or between 0.4 and 1.0 gallon per ton of DRI coated.

In yet another alternative, disclosed is a method of reclaiming and inhibiting activation of metallic iron fines comprising the steps of: (a) applying on DRI fines including metallic iron and iron oxides a coating material optionally having a melting point between 70 and 200° F., including at least one antioxidant and including at least one carboxylic material comprising at least one selected from the group consisting of coatable fatty acid and an esterified derivative thereof, and (b) by application and, optionally, agitation of the coating material on the DRI fines causing the fines to adhere together to form a plurality of DRI agglomerates.

In this alternative, the coating material may be heated before application to form a liquid or semi-liquid before or during the step of coating, and may be with different droplet sizes to facilitate coverage of a range of sizes before or during the step of coating. Alternatively, the coating material may be applied as a solid or semi-solid, such as in the form of shavings or granules, to the DRI fines. In any case, the coating material may be applied at a rate less than 0.2% b by weight of DRI coated or may be applied at between 0.005 and 0.45% by weight per ton of pellets and fines coated. In any case, the coating material may be again selected from the group consisting of palm oil, coconut oil, combinations thereof, and ester derivatives thereof, including at least one antioxidant, and, alternatively or in addition, including carboxylic material more than 30% by weight monounsaturated acid and/or more than 30% by weight oleic acid. The antioxidant in the coating material may also be selected from the group consisting of at least one of butylated hydroxytoluene, carotenoid, phytosterol, squalene, vitamin E, tocopherols, tocotrienols, and mixtures thereof. The coating material may be applied at a rate between 0.2 and 2.0 gallons per ton of DRI coated, or between 0.4 and 1.0 gallon per ton of DRI coated.

In describing these methods, DRI is used to describe traditional DRI products which have been identified as more than 80% metallic iron and are typically more than 90% metallic iron in commercial product (the remainder gangue), as well non-traditional materials such as baghouse dust and BOF dust which is high in iron units.

BRIEF DESCRIPTION OF THE DRAWINGS

The operation and application of the method for reclaiming and inhibiting activation of DRI fines is further described with reference to particular embodiments in relation to the accompanying drawings, in which:

DETAILED DESCRIPTION OF THE DRAWINGS

Presently disclosed is a method of reclaiming and inhibiting activation of DRI fines. The method of reclaiming DRI fines may comprise the steps of forming a moving stream containing DRI pellets and DRI fines coating the moving stream of DRI pellets and DRI fines with a coating material having a melting point between 70 and 200° F., including at least one antioxidant and at least one carboxylic material comprising at least one selected from the group consisting of coatable fatty acid and an esterified derivative thereof to form a coating on the DRI pellets and DRI fines, and, thereafter, moving the DRI agglomerates to a facility for present or later use in making steel. It should be noted here the DRI pellets may be not only those formed by traditional pelletizing equipment, but also other forms of DRI compacts, such as briquettes and balls, prepared by available compacting methods and equipment. DRI fines is used broadly herein to include traditional prepared DRI which may typically be more than 80% metallic iron, as well as other forms of metallic iron fines found in baghouses and other fine collector points in steelmaking, ironmaking and taconite facilities, as well as downstream steel fabricating operations.

Figure 1:
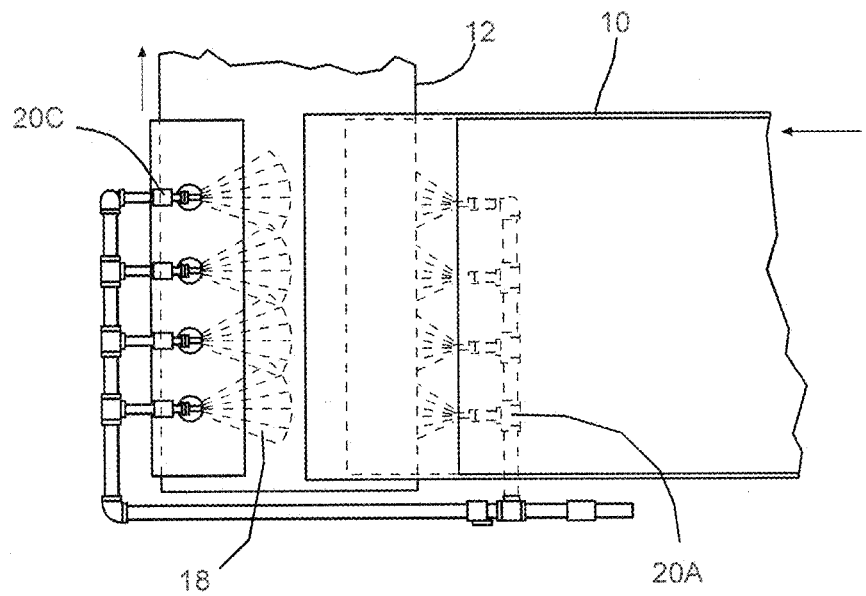
FIG. 1 is a top view and FIG. 2 is a side view illustrating an embodiment of a method for reclaiming DRI fines where the coating material is applied as a liquid.
Figure 2:
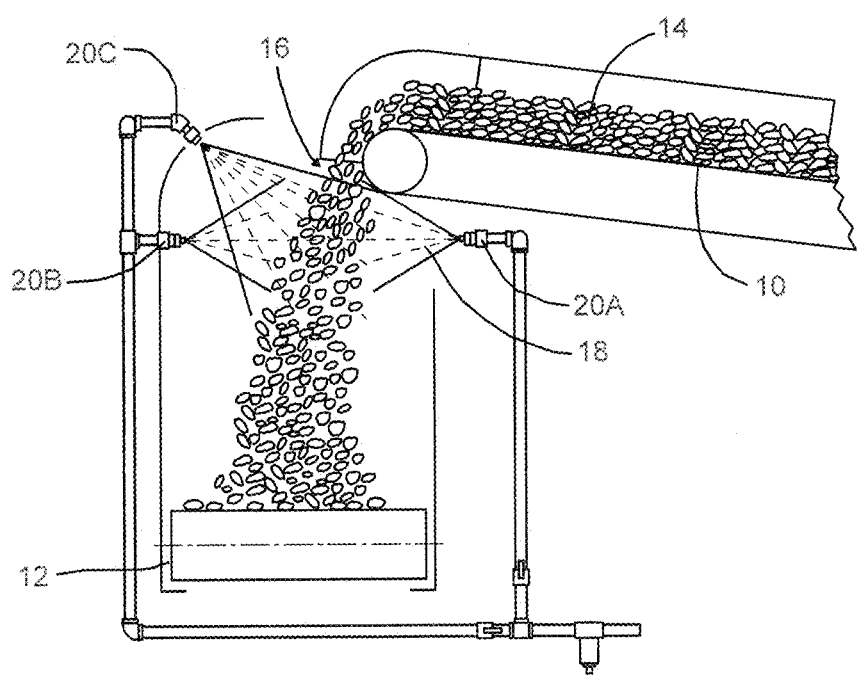

Referring to FIGS. 1 and 2, uncoated DRI pellets and DRI fines in a moving stream 14 on first conveyor 10 are discharged from first conveyor 10 in a falling moving stream 16 to a second conveyor 12. The moving stream 16 of DRI pellets and DRI fines is sprayed, through one or more spray nozzles shown in FIG. 2, with a coating material 18 having a melting point between 70 and 200° F. and including at least one antioxidant and at least one carboxylic material comprising at least one selected from the group consisting of coatable fatty acid and an esterified derivative thereof. The speed of the first conveyor 10 and the rate of flow of coating material 18 from the spray nozzles are coordinated to provide effective coating of the moving stream 16 of DRI pellets and DRI fines. The moving stream 16 may be less than 6 inches thick or less than 4 inches thick. The speed of the first conveyor 10 is adjusted to provide the desired thickness and the flow of coating material and in this manner is regulated to provide for effective coating of the moving stream 16 of DRI pellets and DRI fines to form the DRI agglomerates without excessive coating and wasting of the coating material.

Referring specifically to FIG. 2, as the DRI pellets and DRI fines fall from the first conveyor 10 to the second conveyor 12, the coating material 18 is applied to the moving stream 16 of the DRI pellets and DRI fines. In some embodiments, the coating material 18 is applied to the falling stream from more than one side as through spray nozzles 20A and 20B as shown in FIG. 2. However, multiple spray nozzles 20A and 20B or spray nozzles 20A, 20B and 20C, or some other arrangement of spray nozzles, may be used to provide efficient delivery of coating material 18 to the falling stream 16. The coating material 18 adheres to the DRI pellets and DRI fines to form a plurality of DRI agglomerates reclaiming the DRI fines for use in steelmaking and at the same time inhibiting activation of the DRI. The flow rate of coating material 18 and speed of the first conveyor 10 can be regulated during operation to provide effective formation of the plurality of DRI agglomerates.

Figure 1A:
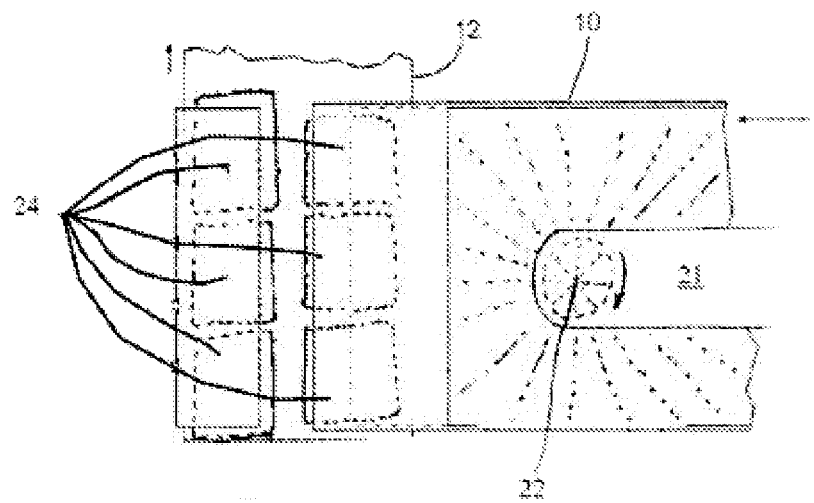
FIG. 1A is a top view and FIG. 2A is a side view illustrating of an alternative embodiment of a method for reclaiming DRI fines where the coating material is applied as a solid.
Figure 2A:
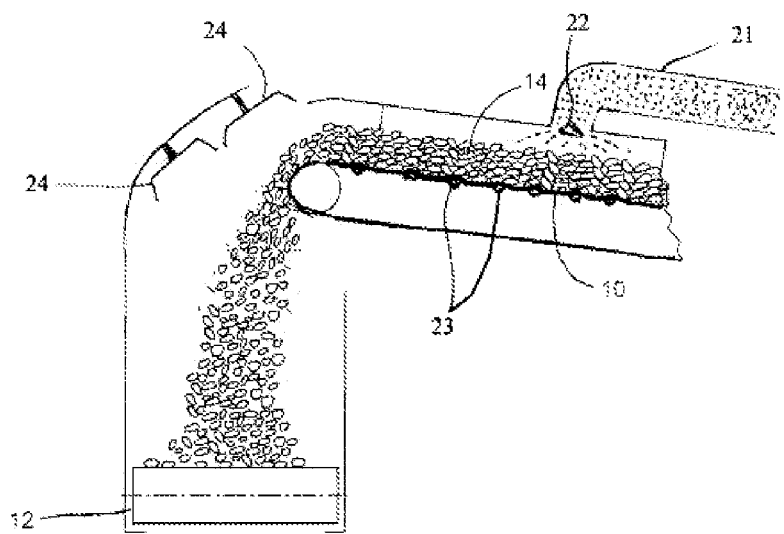

Referring to FIGS. 1A and 2A, an alternative embodiment of the method of reclaiming and inhibiting activation of DRI fines is shown in which the coating material is applied as a solid. The coating material 18 is applied as solid material having a melting point between 70 and 200° F. and including at least one antioxidant and at least one carboxylic material comprising at least one selected from the group consisting of coatable fatty acid and an esterified derivative thereof. Uncoated DRI pellets and DRI fines in moving stream 14 on the first conveyor 10 are again discharged from the first conveyor 10 in a falling moving stream 16 to a second conveyor 12. The coating material 18 in solid form is delivered in a fluidized bed through a conduit 21 and spread over the moving stream 14 by a rotary spreader 22. Rotary spreader 22 is supported as desired by a frame from the conduit 21 over the first conveyor 10, and is fitted with an electric motor or other drive to rotate the rotary spreader 22 as desired. The spreading of the coating material 18 is controlled to provide the amount of coating material 18 directed to effectively coat the DRI pellets and DRI fines in the moving stream 14 on the first conveyor 10. If desired, a series of one or more frames 23 can be positioned in the first conveyor 10 to cause the moving stream 14 to bump over the frame or frames agitating the moving stream 14, so the coating material 18 is separate through the depth of the moving stream 14. Infrared heaters 24 may be positioned in the conveyor frame to radiate the moving stream 16 falling from the first conveyor 10 to the second conveyor 12 and heat the coating material 18 and assist the coating material 18 in coating the DRI pellets and DRI fines. Alternatively or in addition, infrared heaters can be provided over the second conveyor 12 as the stream of DRI pellets and DRI fines moves away from the transfer to facilitate coating by the coating material 18.

Alternatively or in addition, embodiments of the presently disclosed method of reclaiming and inhibiting activation of DRI fines may include applying on DRI pellets and DRI fines a coating material with at least one antioxidant and at least one a carboxylic material comprising at least one selected from the group consisting of coatable fatty acid and an esterified derivative thereof. Further, such methods may include causing by application of the coating material on the DRI pellets and DRI fines the fines to adhere together and to the pellets to form a plurality of DRI agglomerates. In some embodiments the coating material may be in liquid form or solid form. The solid form coating material may be heated before application to form a liquid or semi-liquid. Furthermore, the pellets and fines may be a falling stream when the coating material is applied. The coating material may be vegetable oil, sunflower oil, peanut oil, safflower oil, corn oil, cotton seed oil, flax oil, soy bean oil, olive oil, grape seed oil, canola oil, combinations thereof and ester derivatives thereof.

Figure 3:
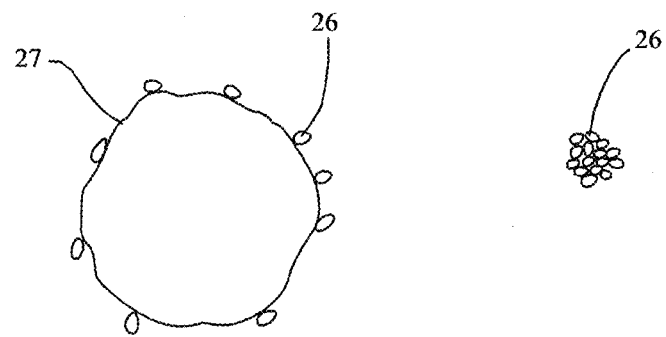
FIG. 3 is a side view illustration of DRI agglomerates formed from DRI pellets and DRI fines or from DRI fines.

FIG. 3 illustrates how the DRI fines 26 adhere to DRI pellets 27 and/or other DRI fines 26 in the coating material 18 when applied as shown, for example, in FIGS. 1 and 2 or FIGS. 1A and 2A. The coating material is heated before, during, and/or after application to the DRI pellets and DRI fines so that after applied and cooled, the coating material firmly adheres to the pellets and fines and causes the DRI fines to adhere together and to the DRI pellets. The coating material also tends to closes the pores of the DRI pellets and DRI fines to inhibit activation of the DRI on exposure to oxygen, for example, in air or moisture. Once coated with the coating material, DRI fines adhere to DRI pellets and other DRI fines forming a plurality of DRI agglomerates. These DRI agglomerates reduce the loss of iron units by substantially decreasing fugitive DRI fines and other waste of DRI fines. The coating and closing the pores of the DRI, the DRI agglomeration decreases the risks associated with the pyrophoric properties of DRI, and also improves compressive strength, making the DRI agglomerates more stable and safer to transport, and provide a DRI agglomerate product that can be transported and handled with substantially reduced risk of fires and the like.

The antioxidant in the coating material also inhibits breakdown of the carboxylic material having at least one selected from the group consisting of coatable fatty acid and/or an esterified derivative thereof in the coating material, and inhibits creation of CO undesirable in transportation and handling of DRI. This antioxidant may be selected from the group consisting of at least one of butylated hydrooxytoluene, carotenoid, phytosterol, squalene, vitamin E, tocopherols, tocotrienols, and mixtures thereof. The coating material may be again selected from the group consisting of palm oil, coconut oil, combinations thereof, and ester derivatives thereof, to include at least one antioxidant, and alternatively or in addition, include carboxylic more than 30% by weight monounsaturated acid and/or more than 30% by weight oleic acid.

Figure 4:
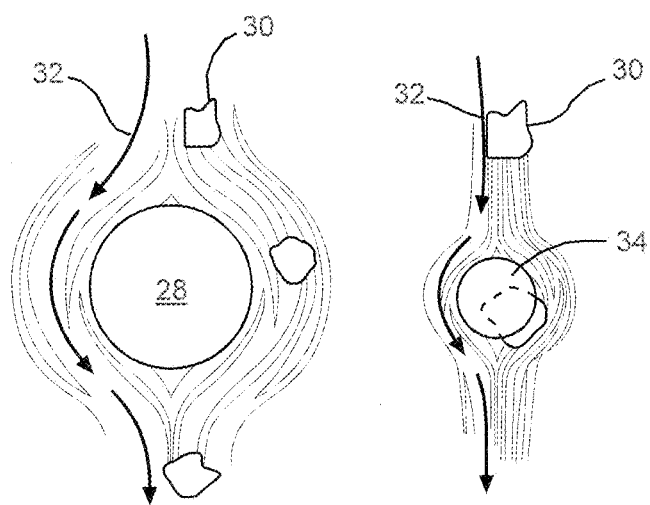
FIG. 4 is an illustration of the effect of droplet size in coating DRI pellets and DRI fines.

In any case, the coating material may be applied at a rate less than 0.2% by weight or may be applied at between 0.005 and 0.45% by weight per ton of pellets and fines coated The coating material may be applied at a rate between 0.2 and 2.0 gallons per ton of coated DRI coated, or may be applied at a rate between 0.4 and 1.0 gallon per ton of DRI coated as desired to effectively coat the DRI. Referring to FIG. 4, the coating material containing fatty acids may be applied in liquid form to the DRI pellets and DRI fines in different size droplets. If the droplet size 28 is substantially larger than the DRI fines particle 30, the particles of DRI fines will follow the air stream 32 around the droplet of the coating material. If the sizes of the droplets 34 of coating material and the fines particles are comparable, then particles 30 of DRI fines will follow the air stream 32 and collide with the droplet coating material. To promote the adhesion of the coating material to the DRI pellets or DRI fines, the droplet size of the coating material may be equal to or smaller than the particle size of the DRI pellets or DRI fines to be coated. For example, the coating material may be applied in a mist having an average droplet size of 1 μm to facilitate the coating of the DRI fines. In addition, larger droplet sizes may be applied to facilitate coating of the larger DRI pellets. Both large droplets and small droplets in a mist may be used to achieve the desired coating for the DRI pellets and DRI fines.

Figure 5:
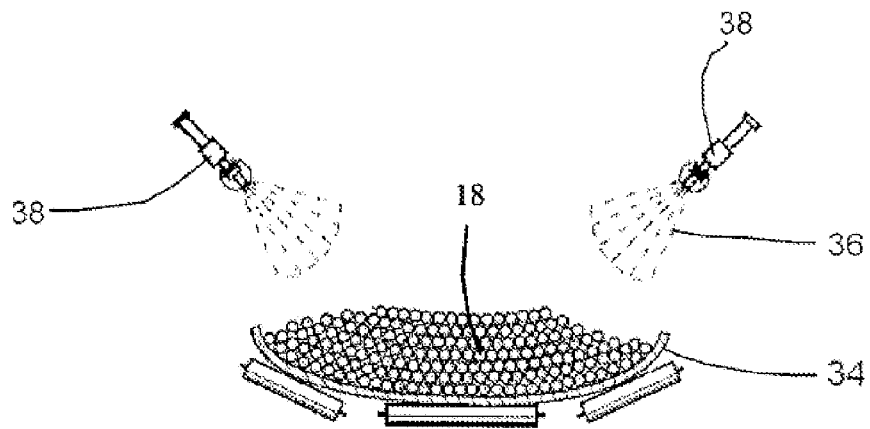
FIG. 5 is a perspective view of another embodiment of a method for reclaiming DRI fines where the coating material is applied as a liquid.

In an alternative embodiment, the coating material 36 may be applied to the DRI pellets with accompanying DRI fines on belt a conveyor 34 as it moves away in a moving stream, as shown in FIG. 5 from a DRI furnace (not shown). DRI pellets with accompanying DRI fines 18 are produced from a DRI furnace in a continuous flow along conveyor 34. The DRI furnace may be a Midrex® stack furnace as described in U.S. Pat. Nos. 3,749,386, 3,748,120, and 6,214,086, or any other furnace suitable for making DRI pellets. In any case, the coating material 36 is applied to the stream of DRI pellets and DRI fines moving along conveyor 34 away from the DRI furnace. The coating material 36 may be heated to coat the DRI pellets and DRI fines at a temperature between 70 and 200° F., and then cooled to ambient temperature. The heated coating material 36 is applied to DRI pellets and DRI fines 18 as they move past the spraying nozzle(s) 38 directed to deliver the coating material 36 toward conveyor 34. Here again, the speed of conveyor 34 and flow of coating material 36 from spraying nozzle(s) 38 are coordinated to provide effective coating of DRI pellets and DRI fines, and cause adherence as shown in FIG. 3. DRI agglomerates are formed of the DRI pellets and DRI fines as they move along the conveyor 34. The DRI agglomerates may be directly transported to an EAF steelmaking facility with reduced dust and other losses of DRI fines 18, and with reclaim of the iron units associated with the DRI fines. Alternatively, the DRI agglomerates may be transported on conveyor 34 to a ship, barge, dump truck, or train hopper car for transportation to an EAF facility or to a storage facility to await use in steelmaking.

Figure 5A:
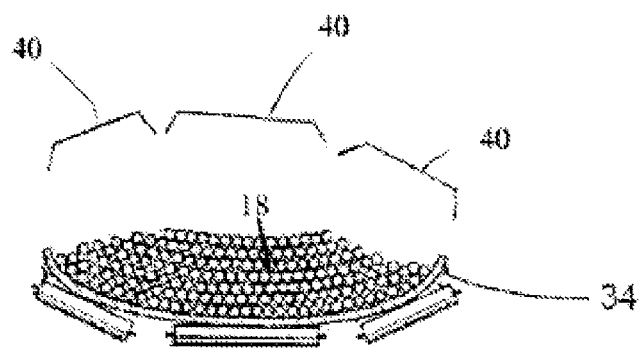
FIG. 5A is a perspective view of another embodiment of a method for reclaiming DRI fines where the coating material is applied as a solid.

In FIG. 5A, in an alternative embodiment, the coating material 36 may be applied in solid form to the DRI pellets with accompanying DRI fines 18 on belt conveyor 34 moving away from a DRI furnace (not shown). As in FIG. 5, the DRI furnace may be a Midrex® stack furnace as described in U.S. Pat. Nos. 3,749,386, 3,748,120, and 6,214,086, or any other furnace suitable for making DRI pellets. The coating material 36 in a solid form is applied to the moving stream of DRI pellets and DRI fines 18 along conveyor 34 utilizing a rotary spreader as described with reference to FIGS. 1A and 2A, or another spreader. If desired, again, a series of one or more frames can be positioned in conveyor 34, causing the moving stream of the DRI pellets and DRI fines to bump over the frame or frames agitating the moving stream so the coating material 36 is spread through the depth of the moving stream 16. Infrared heaters 40 are positioned over the conveyor 34 to radiate the moving stream on second conveyor 34 and heat the coating material 36 to assist the coating material 36 in coating the DRI pellets and DRI fines. The coating material 36 may be heated to coat the DRI pellets and DRI fines 18 at a temperature between 70 and 200° F., and then cooled to ambient temperature. The speed of conveyor 34 and heating of coating material 36 are coordinated to provide effective coating of DRI pellets and DRI fines 18 to cause adherence as shown in FIG. 3 to form DRI agglomerates. Again, the DRI agglomerates may be directly transported to an EAF steelmaking facility with reduced dust and other losses of DRI fines, and with reclaim of the iron units associated with the DRI fines 18. Alternatively also, the DRI agglomerates may be transported on conveyor 34 to a ship, barge, dump truck, or train hopper car for transportation to an EAF facility or to a storage facility to await use in steelmaking.

Figure 6:
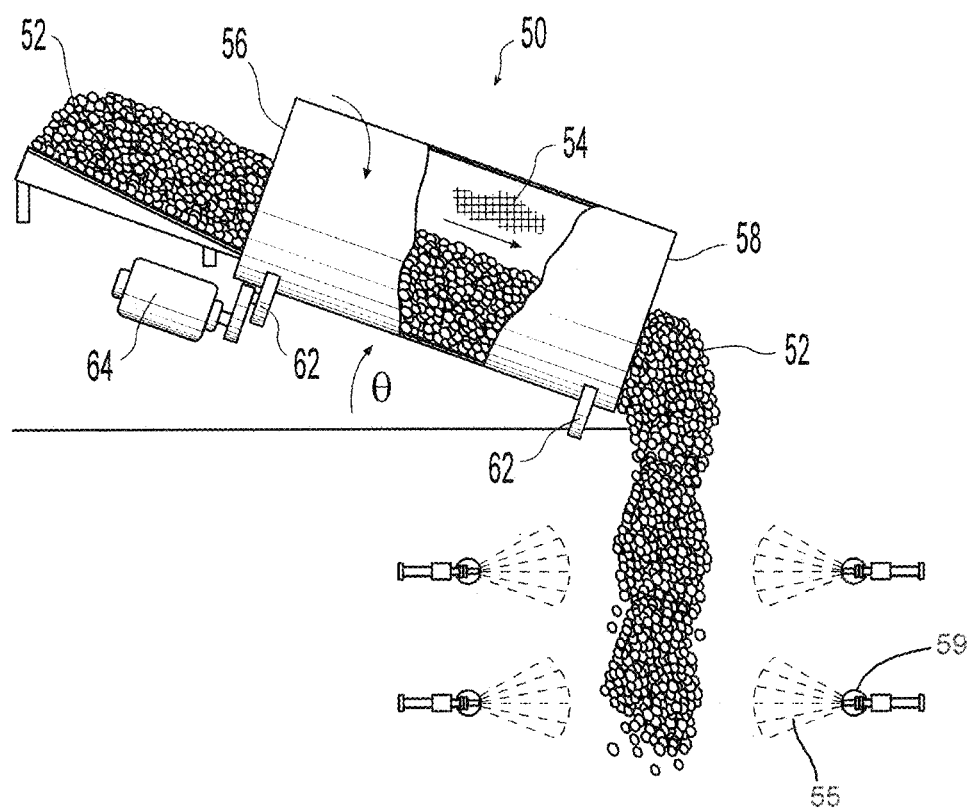
FIG. 6 is an illustration of an alternative embodiment of a method for reclaiming DRI fines.

In another alternative embodiment illustrated in FIG. 6, DRI fines may be separated from the DRI pellets 52, for example, in a rotary chamber 50 before being sprayed with the liquid coating material as shown FIG. 6, or spread with a solid form of the coating material followed by heating with infrared heating (not shown). As shown in FIG. 6, the cylindrical chamber 50 is illustrated having a feed end 56 and a discharge end 58. The chamber 50 has a screen 54 relieved across the inner surface of the chamber 50 as described in more detail in co-pending application Ser. No. 61/381,907 filed Sep. 10, 2010, incorporated herein by reference. The moving stream 52 of DRI pellets and DRI fines is typically from a nearby DRI furnace and delivered by a belt conveyor at the feed end 56 of rotary chamber 50. The moving stream 52 of pellets entering the chamber 50 is tumbled on screen 54 as the chamber rotates, causing the separation of DRI fines. The chamber 50 may be inclined by a desired angle, regulated to adjust the speed of the moving stream 52, to facilitate movement of the DRI pellets through the chamber 50 as the chamber rotates. DRI fines collected through the screen 54 may be separately coated with coating material 18 to form DRI agglomerates and transported directly to an EAF for steelmaking, or may be added back to the moving stream 52 of DRI pellets downstream of the rotary chamber 50 to improve the efficiency of coating and reclaiming of the DRI pellets and DRI fines with the coating material. Alternatively, the agglomerated DRI fines may be remixed with the moving stream 52 of uncoated DRI pellets and DRI fines upstream before entering the chamber 50, so that the coating material from the coated DRI fines adheres to at least a portion of the uncoated DRI pellets and DRI fines in forming DRI agglomerates and improves the efficiency of coating of the uncoated DRI pellets and DRI fines with coating material in chamber 50. The embodiment also has the benefit of polishing the DRI pellets in rotary chamber 50 and concurrently utilizing the invention claimed in co-pending application Ser. No. 61/381,907 filed Sep. 10, 2010. In any case, the agglomerated DRI pellets and DRI fines may be additionally coated with coating material 55 by liquid coating material sprayed through nozzles 59 or by spreading (not shown) solid coating material 18 as the moving stream of DRI pellets, and are transported to an EAF for steelmaking with reduced DRI fines emissions and reduced loss of iron units.

Figure 7:
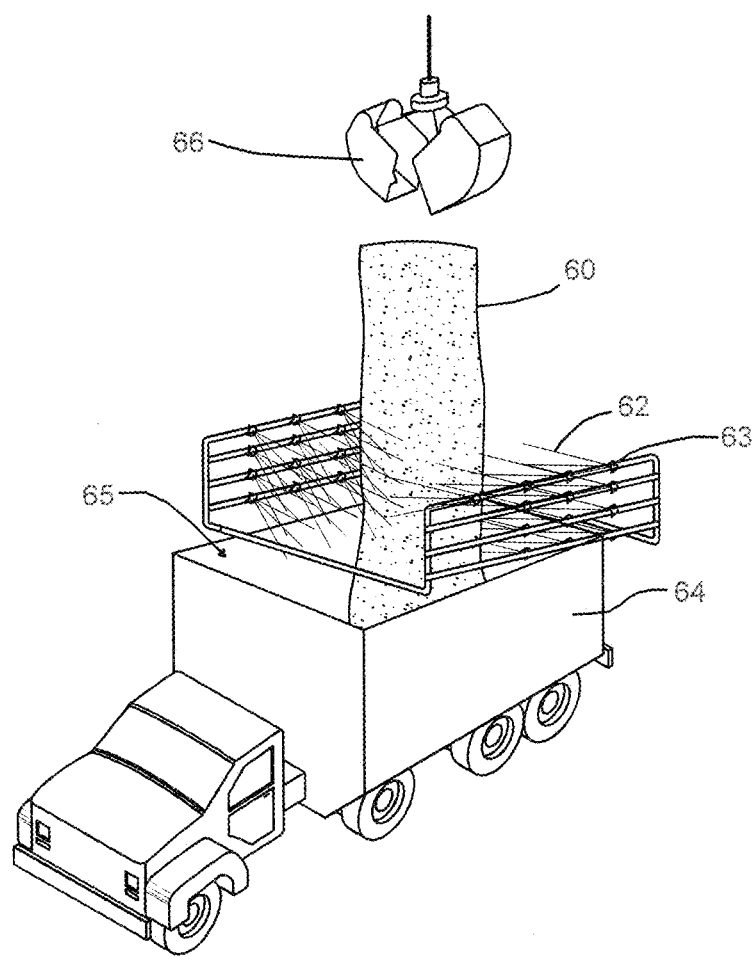
FIG. 7 is an illustration of another alternative embodiment of a method for reclaiming DRI fines.

Referring to FIG. 7, in another embodiment, the DRI pellets and DRI fines 60 may be coated with liquid coating material 62 through spray nozzle 63 or by spreading liquid coating material 62 in solid form and heating to promote coating of the DRI pellets and DRI fines 60 (not shown), while being deposited in a pile in dump truck 64 for transportation. This may be while the DRI pellets and DRI fines are transferred from a ship or barge hold to a truck 64 for delivery to a steelmaking facility. The DRI pellets and DRI fines are removed from the barge or ship hold by a crane (not shown) using a clam shell 66 or other suitable bucket. The clam shell 66 releases the uncoated DRI 60 in a pile in the truck bed 65 such that the DRI pellets and DRI fines are coated by coating material 62 as they fall and distribute in the pile within the truck bed 65. The amount and speed of release of DRI pellets and DRI fines from the clam shell 66 and the rate flow of coating material 62 through spray nozzle 63 or from a solids spreader (not shown) is regulated and controlled to provide for efficient coating of DRI pellets and DRI fines and formation of DRI agglomerates as shown in FIG. 3, facilitated by movement of the pile and the truck during loading and truck travel to a steelmaking or storage facility.

Figure 8:
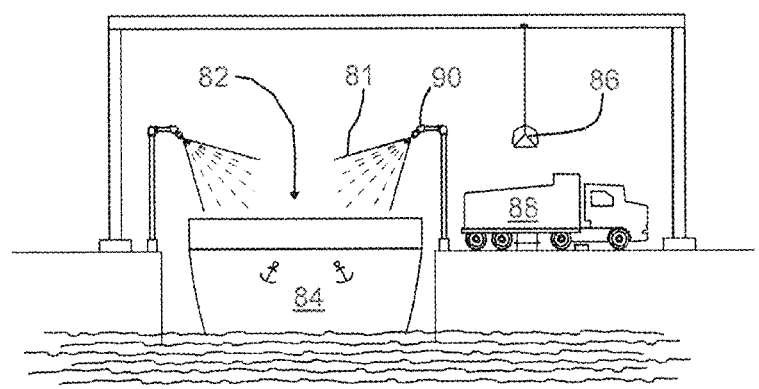
FIG. 8 is a view of yet another embodiment of a method for reclaiming DRI fines.

In another alternative embodiment, as illustrated in FIG. 8, DRI pellets and DRI fines may be coated with a coating material 81 delivered to coat the DRI pellets and DRI fines during removal from a pile in the hold 82 of a ship or barge 84 by clam shell 86 or the like and deposited in a dump truck 88 for transport to a steelmaking facility. In this embodiment, the uncoated DRI pellets and DRI fines may be initially stationary in a pile in the hold 82 of the ship or barge 84 and the coating material 81 is spread either as a liquid or a solid onto the DRI pellets and DRI fines by spray nozzles 90 or a solid spreader (not shown) onto exposed portions of DRI pellets and DRI fines in the pile in the hold 82, as the clam shell 86 removes loads of the DRI pellets and DRI fines from the hold 82 and deposits the same in the dump bed of the truck 88. The coating material 81 coats the exposed portion of the DRI pellets and DRI fines as the material is removed from the hold 82. The movement of the coated DRI pellets and DRI fines as the clam shell 86 operates to promote the DRI fines to adhere to the DRI pellets and other DRI fines to form DRI agglomerates taken away by the clam shell 86. The DRI fines adhere to the DRI pellets and other DRI fines as shown in FIG. 3. In this embodiment, the spread rate of coating material 81 through nozzles 90 or the solid spreader (not shown) is coordinated with the rate of removal of material from the pile in the hold 82 to provide for effective coating of the DRI pellets and DRI fines with the coating material 81 and effectively form DRI agglomerates reducing fines emissions and reclaiming iron units that would otherwise be lost as DRI fines.

Figure 9:
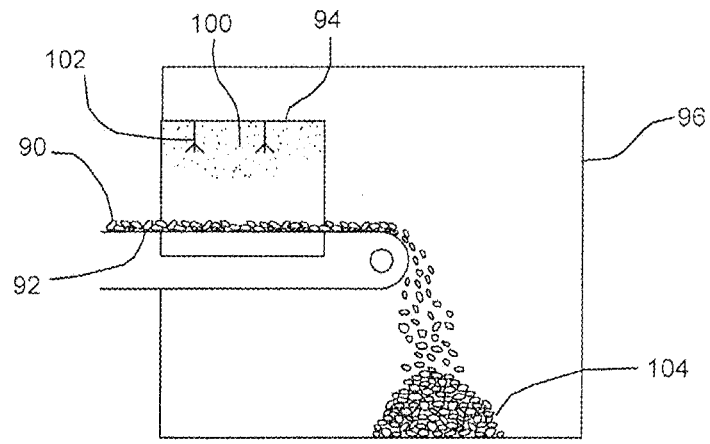
FIG. 9 is an illustration of yet another embodiment of a method for reclaiming DRI fines where the coating material is applied as a liquid.

Referring to FIG. 9, another embodiment of the method for reclaiming DRI fines is illustrated where a moving stream 90 of DRI pellets and DRI fines is transported on conveyor 92 into a storage building 96 in proximity to an EAF steelmaking facility. A shroud 94 is provided at a transfer location as moving stream 90 on the conveyor 92 enters the storage building 96. Alternatively, the shroud 94 may be located outside the storage building 96 as desired. In any case, the moving stream 90 of DRI pellets and DRI fines on conveyor 92 passes through the shroud 94. A spray in the form of a fog of coating material 100 is provided through nozzles 102 in the shroud 94 to coat the moving stream 90 of DRI pellets and DRI fines as they enter the storage building 96, and cause the DRI fines to adhere to the DRI pellets and other DRI fines to form DRI agglomerates reclaiming the DRI fines in a storage pile 104 in the storage building 96 for use in steelmaking. Here again, the coating material 100 is heated before or during application to cause the DRI fines when coated to adhere to each other and to the DRI pellets as cooled.

Figure 9A:
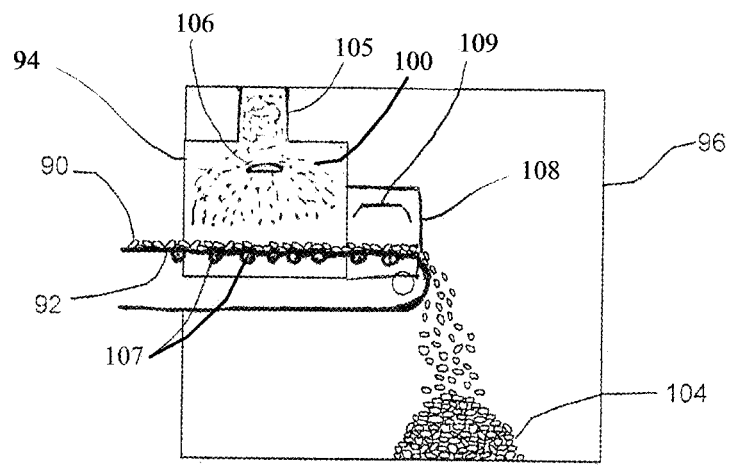
FIG. 9A is an illustration of alternative embodiment to FIG. 9 of a method for reclaiming DRI fines where the coating material is applied as a solid.

Referring to FIG. 9A, an alternative embodiment to FIG. 9 of the method for reclaiming DRI fines is illustrated in which the coating material is applied in solid form. Again, a moving stream 90 of DRI pellets and DRI fines is transported on conveyor 92 into a storage building 96 in proximity to an EAF steelmaking facility. Again, shroud 94 is provided at a transfer location as moving stream 90 on the conveyor 92 outside or as it enters the storage building 96. In any case, the moving stream 90 of DRI pellets and DRI fines on conveyor 92 passes through the shroud 94. The coating material 100 is applied as solid material optionally having a melting point between 70 and 200° F. and comprising at least one antioxidant and at least one a carboxylic material comprising at least one selected from the group consisting of coatable fatty acid and an esterified derivative thereof. The coating material 100 in solid form may be delivered in a fluidized bed through conduit 105 and spread over the moving stream 90 by a rotary spreader 106. Spreader 106 may be supported as desired by a frame from the conduit 105 or shroud 94, and may be fitted with an electric motor or other drive to spread the coating material 100 with the spreader 106 as desired. The spreading of the coating material 100 is controlled to provide the amount of coating material 100 desired to effectively coat the DRI pellets and DRI fines in the stream moving on conveyor 92 through shroud 94. If desired, a series of one or more frames 107 can be positioned in the conveyor 92, causing the moving stream 90 to bump over the frame or frames agitating the moving stream 90, so the coating material 100 is spread through the depth of the moving stream 90. After passing through shroud 94, the moving stream 90 on the conveyor 92 passes through shroud 108 where infrared heaters 109 are positioned to radiate the moving stream 90 over which the solid coating material 100 may be spread and heated the coating material 100 promoting the coating material 100 to coat the DRI pellets and DRI fines. The spread coating material 100 thus coats the DRI pellets and DRI fines causing the DRI fines to adhere to the DRI pellets and other DRI fines to form DRI agglomerates reclaiming the DRI fines.

In any of the embodiments shown in FIG. 1 through 9, the coating material may be a solid, such as shavings or granules, coated on the DRI pellets and/or DRI fines by agitation and heating of the coating material and moving stream of the DRI pellets and/or DRI fines. In any case, the coating material may be applied at a rate less than 0.2% a rate or may be applied at between 0.005 and 0.45% by weight per ton of pellets and fines coated The coating material may be applied at a rate between 0.2 and 2.0 gallons per ton of DRI coated, or may be applied at a rate between 0.4 and 1.0 gallon per ton of DRI coated, or may be applied at a rate between 0.4 and 1.0 gallon per ton of DRI coated as desired to effectively coat the DRI.

Figure 10:
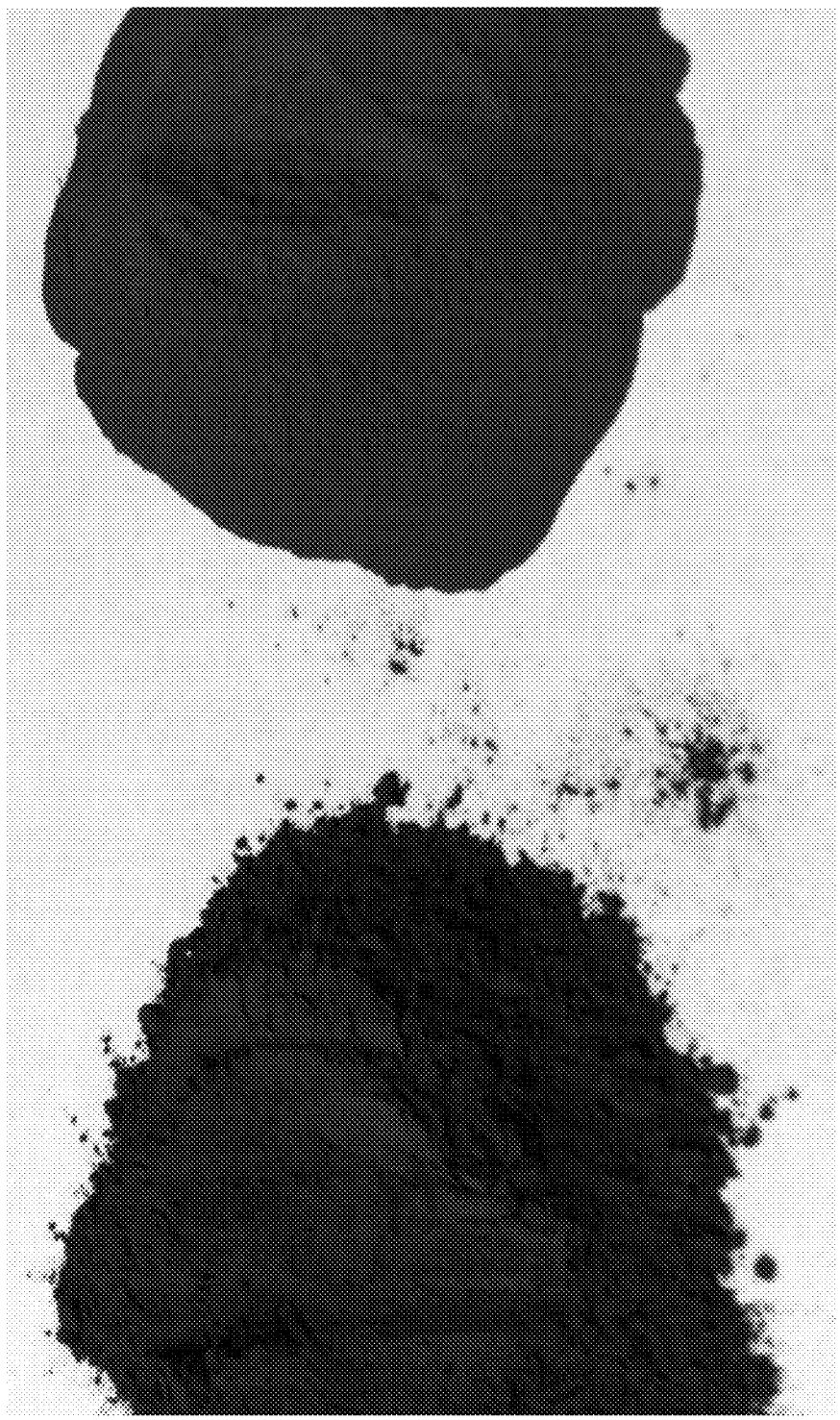
FIG. 10 is photograph showing the difference in texture between regular DRI fines and DRI fines coated with coating material of the present invention and formed into DRI agglomerates.

Referring to FIG. 10, the difference in texture of the DRI agglomerates (also referred to as ORF fines) of the present invention as compared with untreated DRI fines is shown. The DRI agglomerates, shown on the left-hand side of FIG. 10, display a clumpier texture than regular DRI fines, which are shown on the right-hand side of FIG. 10. This is caused by the adherence of the DRI fines together with coating material 18 to form the DRI agglomerates. FIG. 10 visually shows the difference by comparing untreated DRI fines with the DRI agglomerates, with the DRI fines coming together coated with coating material 18. The particular coating material 18 used in this test was palm oil including a mixture of antioxidants of butylated hydroxytoluene, carotenoid, phytosterol, squalene, vitamin E, tocopherols, tocotrienols. The coating material was heated to 145° F. prior to coating the DRI fines or applied as a solid in the form of shavings.

In a steel plant, usage of regular untreated DRI pellets and DRI fines was also compared with DRI agglomerates made by coating with coating material 18 as described above. The results are shown in Table I below.

TABLE 1

|  | DRI Agglomerates | Uncoated DRI |
|---|---|---|
| DRI Usage (tons) | 1074 | 1074 |
| Weight of Fines generated (lbs) | 4760 | 9160 |
| % Fines generated | 0.22% | 0.43% |
| Max VOC value (lb/hr) | 8.2 | 27.0 |
| Average VOC value (lb/hr) | 5.8 | 8.5 |

As seen by the TABLE 1, 1074 tons of DRI was used and 1074 tons of DRI pellets and fines coated with coating 18. Again, palm oil including a mixture of antioxidants of butylated hydroxytoluene, carotenoid, phytosterol, squalene, vitamin E, tocopherols, tocotrienols is used for the coating material, preheated to 145° F. and applied to the DRI pellets and DRI fines. As shown from Table I, the amount of fines generated was reduced from 0.43% (9186 pounds) to 0.22% (4760 pounds). We also observed the VOC readings at the plant during these trials showed the maximum VOC value fell dramatically from 27.0 to 8.2 (pounds per hour) and the average VOC values fell from 8.5 to 5.8 (pounds per hour). These VOC values for the uncoated DRI were taken from readings taken over the period from May 1-May 25, 2011.

Reactivity Measurements

Figure 11:
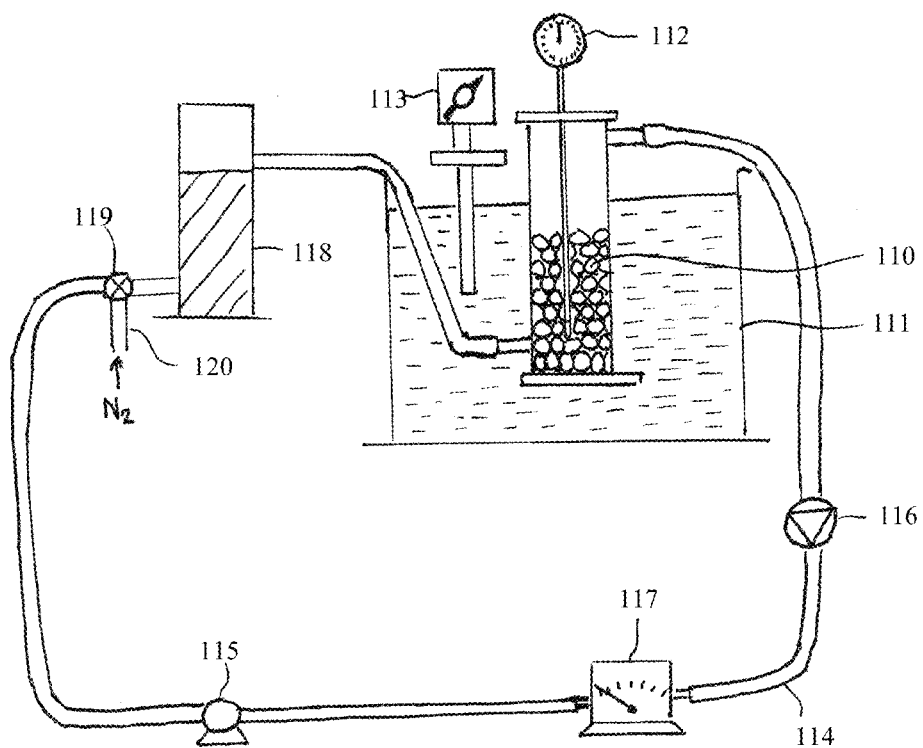
FIG. 11 is an illustration of the apparatus used to measure the reactivity of DRI pellets and DRI fines where coated with coating material in accordance with the present invention.

We have found no standardized test for measuring reactivity levels in DRI pellets and DRI fines. We, therefore, designed an apparatus for measuring DRI reactivity as shown in FIG. 11. A sample of 200 grams of DRI (coated or uncoated) was provided in a copper canister 110 placed in a water bath 111 to be able to maintain temperature control. The canister 110 had at its top a thermometer 112 to the measure temperature in the canister 110, and the temperature maintained by a heater 113 with a thermostat to control the water bath 111 in which the canister 110 is immersed. The temperature of the canister 110 may be maintained at about 65° F. Circulated through the DRI sample in the canister 110 is oxygen pumped through a circular loop 114, containing a pump 115, a flow meter 116 and an oxygen meter 117. Also in the loop 114 is a desiccator ($CaCl_2$) 118, that controls the moisture content of the oxygen flowing through the loop 114. A valve 119 was also provided and coupled to a nitrogen source 120 so that the loop 114 could be flushed before and after each test to maintain control.

Figure 12:
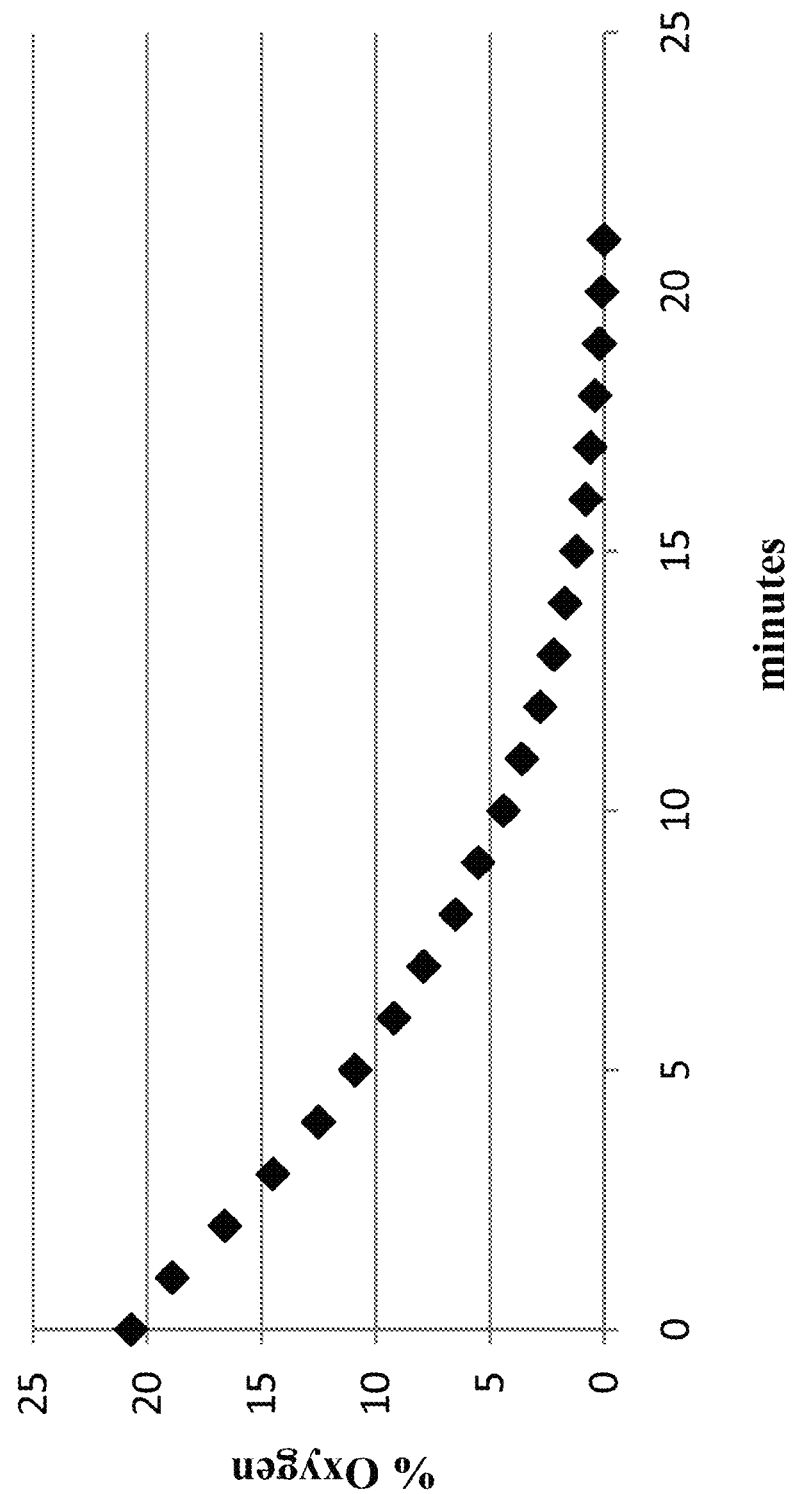
FIG. 12 is a graph reporting reactivity tests of DRI pellets and DRI fines coated in accordance the present invention where the coating material was liquid as applied.

The first test was with 200 grams of DRI pellets and DRI fines, coated with palm oil containing a mixture of antioxidant of butylated hydroxyluene, carotenoid, phytosterol, squalene, vitamin E, tocopherols, tocotrienols. The coating was done by heating the coating material 18 to 145° F. before application to DRI pellets and DRI fines. The results of the tests are shown in FIG. 12. As shown by FIG. 12, the reactivity to oxygen of the coated DRI with coating material 18 (palm oil including antioxidant) reduced from 20.7 to 0.2 in twenty minutes. This shows the DRI pellets and DRI fines coated with coating material 18 to form DRI agglomerates not only reclaimed substantial amounts of DRI fines for use in steelmaking, but substantially inhibited the reactivity of the DRI to oxygen. The reduction to reactivity to oxygen makes the DRI pyrophobic during transport and handling, reducing the risk of fires consuming the DRI and increasing the iron units available to reach the steelmaking furnace.

Figure 13:
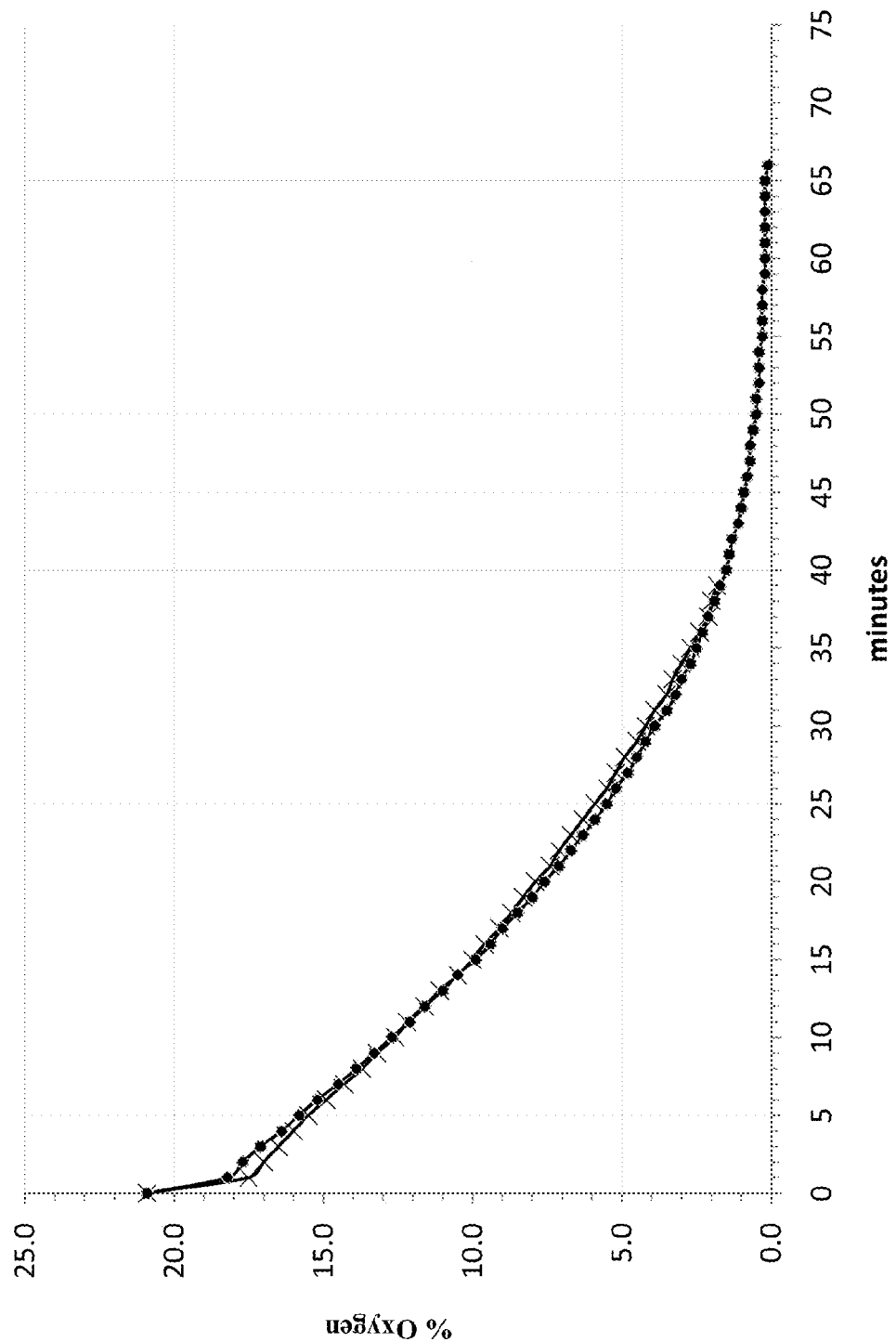
FIG. 13 is a graph reporting further reactivity tests of DRI pellets and DRI fines coated in accordance the present invention where the coating material was solid as applied.

A second reactivity test used the testing apparatus described in FIG. 11 where the coating material 18 was applied to the DRI pellets and DRI fines as a solid. The coating material was shavings of palm oil containing a mixture of antioxidant of butylated hydroxytoluene, carotenoid, phytosterol, squalene, vitamin E, tocopherols, tocotrienols. In this test, the DRI pellets and fines were coated by agglomeration with 0.5% by weight solid shavings at room temperature. Here again, a substantial reduction in activity of DRI pellets and DRI fines to oxygen was found. As shown in FIG. 13, the reactivity of the DRI to oxygen fell from 21.0 to 5.0 over the first 25 minutes, and to essentially zero in 60 minutes. We performed this test twice on different samples as shown in FIG. 13, and achieved essentially the same result.

These tests and plant observations demonstrated the benefit of the presently disclosed method. An over 50% decrease in dust observed at collection devices demonstrated the large reclaim of iron units in the form of DRI agglomerates with the present method for use in the steelmaking. The lack of oily residue on a conveyor belt also was a good indication that showed amounts of the coating material was effectively coating the DRI pellets and DRI fines. Moreover, the very substantial decrease in reactivity of DRI pellets and DRI fines to oxygen by use of the present method demonstrates the large decrease in the pyrophobic nature of DRI with use of the present method. This is a good measure of the reduction in the pyrophilic character by the DRI in reactivity that occurs in transporting DRI by conveyor, truck, barge, ship or train, or a combination thereof, with the present method. In short, as shown, the present method provided for not only a marked reclaim of DRI fines and recovery of iron units for a steelmaking facility, but also dramatically reduced the reactivity of the DRI, reducing risks of fires and other hazards during transportation.

While it has been described with reference to certain embodiments, it will be understood by those skilled in the art that various changes may be made and equivalents may be substituted without departing from scope. In addition, many modifications may be made to adapt a particular situation or material to the teachings without departing from its scope. Therefore, it is intended that it not be limited to the particular embodiments disclosed, but that it will include all embodiments falling within the scope of the appended claims.

What is claimed is:

1. A method of reclaiming and inhibiting activation of DRI comprising the steps of:
   a) applying onto DRI pellets and fines of DRI in a pile or moving in a stream a coating material having a melting point between 70 and 200° F. and comprising at least one antioxidant and at least one a carboxylic material including at least one selected from the group consisting of coatable fatty acid and an esterified derivative thereof,
   b) forming a coating on the pellets and fines to cause the fines to adhere together and to the pellets to form a plurality of DRI agglomerates.

2. The method of reclaiming and inhibiting activation of DRI as claimed in claim 1 where the coating material is heated before application to form a liquid or semi-liquid and said pellets and said fines are in a falling stream when the step of coating occurs.

3. The method of reclaiming and inhibiting activation of DRI as claimed in claim 2 where the coating material is applied as a liquid or semi-liquid in different droplet sizes to facilitate coverage of the fines and pellets with the coating material.

4. The method of reclaiming and inhibiting activation of DRI as claimed in claim 1 where the coating material is applied as a solid to the pellets and the fines.

5. The method of reclaiming and inhibiting activation of DRI as claimed in claim 1 where the coating material is selected from the group consisting of palm oil, coconut oil, combinations thereof, and ester derivatives thereof and including of at least one antioxidant.

6. The method of reclaiming and inhibiting activation of DRI as claimed in claim 1 where the coating material includes carboxylic material more than 30% by weight monounsaturated acid.

7. The method of reclaiming and inhibiting activation of DRI as claimed in claim 1 where the coating material is palm oil and including of at least one antioxidant.

8. The method of reclaiming and inhibiting activation of DRI as claimed in claim 1 where the antioxidant in the coating material is selected from the group consisting of at least one of butylated hydroxytoluene, carotenoid, phytosterol, squalene, vitamin E, tocopherols, tocotrienols, and mixtures thereof.

9. The method of reclaiming and inhibiting activation of DRI as claimed in claim 1 where the coating material is liquid or semi-liquid applied at a rate less than 0.2% by weight per ton of pellets and fines coated.

10. The method of reclaiming and inhibiting activation of DRI as claimed in claim 1 where the coating material is liquid or semi-liquid applied at a rate between 0.005 and 0.45% by weight per ton of pellets and fines coated.

11. The method of reclaiming and inhibiting activation of DRI as claimed in claim 1 where the coating material includes more than 30% by weight oleic acid.

12. The method of reclaiming and inhibiting activation of DRI as claimed in claim 1 where the DRI comprises more than 90% metallic iron.

13. The method of reclaiming and inhibiting activation of DRI as claimed in claim 1 where the coating material is heated before application to form a liquid or semi-liquid and the pellets and fines are in a pile when the step of coating occurs.

14. A method of reclaiming and inhibiting activation of DRI comprising the steps of:
   (a) reclaiming and inhibiting activation of DRI with a coating material having a melting point between 70 and 200° F. and comprising at least one antioxidant and at least one selected for the group consisting of coatable fatty acid and an esterified derivative thereof forming a coating on the fines and causing fines to adhere together to form a plurality of DRI agglomerates; and
   (b) moving the DRI agglomerates containing coated fines to a facility for use in making steel.

15. The method of reclaiming and inhibiting activation of DRI as claimed in claim 14 where the fines are collected before the step of coating.

16. The method of reclaiming and inhibiting activation of DRI as claimed in claim 14 where the coating material is applied as a liquid or semi-liquid in different droplet sizes to facilitate coverage of the fines.

17. The method of reclaiming and inhibiting activation of DRI as claimed in claim 14 where the coating material is applied as a liquid or semi-liquid at a rate at a rate less than 0.2% by weight per ton of fines coated.

18. The method of reclaiming and inhibiting activation of DRI as claimed in claim 14 where the coating material is liquid or semi-liquid applied at a rate between 0.005 and 0.45% by weight per ton of pellets and fines coated.

19. The method of reclaiming and inhibiting activation of DRI as claimed in claim 14 where the coating material includes more than 30% by weight oleic acid.

20. The method of reclaiming and inhibiting activation of DRI as claimed in claim 14 where the coating material is palm oil and at least one antioxidant.

21. A reclaimed product comprising reclaimed and activation inhibited DRI with a coating material having a melting point between 70 and 200° F. and comprising an antioxidant and carboxylic material containing at least one fatty acid with DRI fines adherent together and optionally to DRI pellets to form DRI agglomerates.

22. The reclaimed product comprising reclaimed and activation inhibited DRI as claimed in claim 21 where the coating material containing at least one unsaturated fatty acid is palm oil.

23. The reclaimed product comprising reclaimed and activation inhibited DRI as claimed in claim 21 where the coating material contains at least one unsaturated fatty acid contains more than 30% oleic acid.

24. The reclaimed product comprising reclaimed and activation inhibited DRI as claimed in claim 21 where the coating material is less than 0.2% by weight per ton of fines coated.

25. The reclaimed product comprising reclaimed and activation inhibited DRI as claimed in claim 21 where the coating material is between 0.005 and 0.45% by weight per ton of fines coated.

26. The reclaimed product comprising reclaimed and activation inhibited DRI as claimed in claim 21 where the coating material includes more than 30% by weight oleic acid.

27. A method of reclaiming and inhibiting activation of DRI comprising the steps of:
   a) applying on DRI pellets and DRI fines a coating material comprising at least one antioxidant and at least one a carboxylic material including at least one selected from the group consisting of coatable fatty acid and an esterified derivative thereof,
   b) causing by application the coating material on the DRI pellets and DRI fines the fines to adhere together and to the pellets to form a plurality of DRI agglomerates.

28. The method of reclaiming and inhibiting activation of DRI as claimed in claim 27 where the coating material is heated before application to form a liquid or semi-liquid and the moving stream of said pellets and said fines is a falling stream when the step of coating occurs.

29. The method of reclaiming and inhibiting activation of DRI as claimed in claim 27 where the coating material is applied as a liquid or semi-liquid in different droplet sizes to facilitate coverage of the fines and pellets with the coating material.

30. The method of reclaiming and inhibiting activation of DRI as claimed in claim 27 where the coating material is applied as a solid to the stream of the pellets and the fines.

31. The method of reclaiming and inhibiting activation of DRI as claimed in claim 27 where the carboxylic coatable material is selected from the group consisting of vegetable oil, sunflower oil, peanut oil, safflower oil, corn oil, cotton seed oil, flax oil, soy bean oil, olive oil, grape seed oil, canola oil, combinations thereof and ester derivatives thereof.

32. The method of reclaiming and inhibiting activation of DRI as claimed in claim 27 where the coating material includes carboxylic more than 30% by weight monounsaturated acid.

33. The method of reclaiming and inhibiting activation of DRI as claimed in claim 27 where the coating material is palm oil.

34. The method of reclaiming and inhibiting activation of DRI as claimed in claim 27 where the antioxidant in the coating material is selected from the group consisting of at least one of butylated hydroxytoluene, carotenoid, phytosterol, squalene, vitamin E, tocopherols, tocotrienols, and mixtures thereof.

35. The method of reclaiming and inhibiting activation of DRI as claimed in claim 27 where the coating material is liquid or semi-liquid applied at a rate less than 0.2% by weight per ton of pellets and fines coated.

36. The method of reclaiming and inhibiting activation of DRI as claimed in claim 27 where the coating material is liquid or semi-liquid applied at a rate between 0.005 and 0.45% by weight per ton of pellets and fines coated.

37. The method of reclaiming and inhibiting activation of DRI as claimed in claim 27 where the coating material includes more than 30% by weight oleic acid.

* * * * *